US005750304A

United States Patent [19]
Yamaguchi et al.

[11] Patent Number: 5,750,304
[45] Date of Patent: May 12, 1998

[54] ENCAPSULATED TONER FOR HEAT-AND-PRESSURE FIXING AND METHOD FOR PRODUCING THE SAME

[75] Inventors: Takashi Yamaguchi; Tetsuya Asano; Yoshihiro Fukushima; Koji Akiyama; Kuniyasu Kawabe, all of Wakayama, Japan

[73] Assignee: Kao Corporation, Tokyo, Japan

[21] Appl. No.: 633,211

[22] Filed: Apr. 16, 1996

[30] Foreign Application Priority Data

Apr. 28, 1995 [JP] Japan ................................. 7-129765

[51] Int. Cl.$^6$ .......................... G03G 9/097; G03G 9/093
[52] U.S. Cl. .......................... 430/110; 430/138; 430/137
[58] Field of Search ...................... 430/109, 138, 430/110, 137

[56] References Cited

U.S. PATENT DOCUMENTS

| | | | |
|---|---|---|---|
| 2,297,691 | 10/1942 | Carlson | 430/31 |
| 2,357,809 | 9/1944 | Carlson | 430/31 |
| 3,269,626 | 8/1966 | Albrecht et al. | 226/177 |
| 4,780,390 | 10/1988 | Hosoi | 430/138 |
| 5,244,768 | 9/1993 | Inaba | 430/137 |

OTHER PUBLICATIONS

English Abstract of JP 48075032.
English Abstract of JP 48075033 (Pub. Oct. 9, 1973).
English Abstract of JP 61056352 (Pub. Mar. 22, 1986).
English Abstract of JP 58205162 (Pub. Nov. 30, 1983).
English Abstract of JP 63281168 (Pub. Nov. 17, 1988).
English Abstract of JP 04184358 (Pub. Jul. 1, 1992).
English Abstract of JP 6130713 (Pub. May 13, 1994).
English Abstract of JP 83057102 (Pub. Dec. 19, 1983).
English Abstract of JP 60184259 (Pub. Sep. 19, 1985).
English Abstract of JP 62150260 (Pub. Jul. 4, 1987).
English Abstract of JP 62150261 (Pub. Jul. 4, 1987).
English Abstract of JP 53124428 (Pub. Oct. 30, 1978).
*Microcapsule*, Chapter 2, T. Kondo & N. Koishi, 1987, published by Sankyo Shuppan K.K. (Abridged Translation).

Primary Examiner—Roland Martin
Attorney, Agent, or Firm—Birch, Stewart, Kolasch & Birch, LLP

[57] ABSTRACT

The encapsulated toner for heat-and-pressure fixing including a heat-fusible core material containing at least a thermoplastic resin and a coloring agent and a shell comprising a hydrophilic resin formed thereon so as to cover the surface of the core material, wherein the core material contains a silicone oil having a kinematic viscosity of from 10 to 500 cSt at 25° C., and wherein the encapsulated toner is obtainable by in situ polymerization method. Such an encapsulated toner can be produced by in situ polymerization method including the following steps (a)–(c): (a) dissolving an amorphous polyester in a mixture comprising a core material-constituting monomer, a polymerization initiator, a silicone oil, and a coloring agent; (b) dispersing the mixture obtained in step (a) in an aqueous dispersant, and localizing the amorphous polyester on the surface of droplets of a core-constituting material to give a polymerizable composition; and (c) polymerizing the polymerizable composition obtained in step (b) by in situ polymerization method to form a core material, wherein the core material is covered with a shell comprising the amorphous polyester, thereby giving an encapsulated toner.

9 Claims, No Drawings

ENCAPSULATED TONER FOR HEAT-AND-PRESSURE FIXING AND METHOD FOR PRODUCING THE SAME

BACKGROUND OF THE INVENTION

1. Field of the Invention

The present invention relates to an encapsulated toner for heat-and-pressure fixing used for development of electrostatic latent images in electrophotography, electrostatic printing, or electrostatic recording, and to a method for producing such an encapsulated toner.

2. Discussion of the Related Art

As disclosed in U.S. Pat. Nos. 2,297,691 and 2,357,809 and other publications, conventional electrophotography comprises the steps of forming an electrostatic latent image by evenly charging a photoconductive insulating layer (a charging process), subsequently exposing the layer to eliminate the charge on the exposed portion (an exposing process) and visualizing the formed image by adhering colored charged fine powder, known as a toner, to the latent image (a developing process); transferring the obtained visible image to an image-receiving sheet such as a transfer paper (a transfer process); and permanently fixing the transferred image by heating, pressure application or other appropriate means of fixing (a fixing process).

As indicated above, the toner must meet the requirements not only of the developing process, but also of the transfer process and the fixing process.

In the above fixing process, from the viewpoint of having remarkably good thermally efficiency by the pressure-contact of a heat roller surface and an image-bearing surface of the sheet to be fixed, the heat-and-pressure fixing method using a heat roller is widely used in various high-speed and low-speed copy machines. However, when the surface of a heat roller contacts the surface of the visible image, the toner is likely to cause a so-called "offset phenomenon," wherein the toner is adhered to the surface of the heat roller, and thus transferred to a subsequent transfer paper.

In order to prevent this phenomenon, the surface of a heat roller is coated with a material having excellent release properties for the toner such as fluororesins, and further a releasing agent such as a silicone oil is applied thereon. However, the method of applying a silicone oil, etc. is likely to disadvantageously make the overall fixing apparatus large, thereby increasing its costs and also making it complicated, to bring about various device troubles.

Meanwhile, since the lowest fixing temperature of a toner is generally between the temperature of low-temperature offsetting of the toner and the temperature of the high-temperature offsetting thereof, the serviceable temperature range of the toner is from the lowest fixing temperature to the temperature for high-temperature offsetting. Accordingly, by lowering the lowest fixing temperature as much as possible and raising the temperature at which high-temperature offsetting occurs as much as possible, the serviceable fixing temperature can be lowered and the serviceable temperature range can be widened, which enables energy saving, high-speed fixing and prevention of curling of paper.

From the above reasons, the development of a toner for heat-and-pressure fixing having excellent low-temperature fixing ability and high-temperature offset resistance has been desired.

Conventionally, various methods in which low-temperature fixing ability and offset resistance are achieved by using an encapsulated toner comprising a core material and a shell formed thereon so as to cover the surface of the core material have been proposed.

Techniques for achieving low-temperature fixing include those having a core material made of a low-melting wax which is easily plastically deformable, as disclosed in U.S. Pat. No. 3,269,626, Japanese Patent Examined Publication Nos. 46-15876 and 44-9880, and Japanese Patent Laid-Open Nos. 48-75032 and 48-75033. Further, an encapsulated toner for heat roller fixing, which comprises a core material made of a resin in the form of a liquid or a core material made of a resin having a low glass transition temperature which imparts improvement in the fixing strength, though blocking at a high temperature may take place if used alone, and a shell made of a high-melting point resin wall which is formed by interfacial polymerization for the purpose of imparting a blocking resistance to the toner has been proposed (Japanese Patent Laid-Open Nos. 61-56352 and 58-205162).

Examples of encapsulated toners using polyester resins as the shell materials include encapsulated toners having a shell made of a thermotropic liquid crystal polyester (Japanese Patent Laid-Open No. 63-281168); encapsulated toners using a crystalline polyester (Japanese Patent Laid-Open No. 4-184358); and encapsulated toners having a shell-forming material comprising an amorphous polyester (Japanese Patent Laid-Open No. 6-130713).

On the other hand, the encapsulated toners for improving the offset resistance include encapsulated toners containing silicone oils; encapsulated toners using resins containing a crosslinking agent in a suitable amount as core material resins; encapsulated toners containing releasing materials as core materials; and encapsulated toners incorporating a silicone oil in core materials containing oily solvents and polymers.

Among the above toners, examples of encapsulated toners containing silicone oils include the following:

(a) Japanese Patent Examined Publication No. 58-57102 discloses a microcapsule toner for heat fixing comprising a core substance mainly comprising a releasing material, such as a silicone oil, and a shell wall substance mainly comprising a thermoplastic resin formed on the core substance;

(b) Japanese Patent Laid-Open No. 60-184259 discloses a microcapsule toner for pressure fixing containing a particular silicone compound;

(c) Japanese Patent Laid-Open No. 62-150260 discloses an encapsulated toner comprising a core substance containing a particular silicone compound in an unmelted state in the binder resin, and a shell comprising metal oxide particles; and (d) Japanese Patent Laid-Open No. 62-150261 discloses an encapsulated toner comprising core substances containing a silicone oil having a kinematic viscosity of from 500 to 9500 cSt (at 25° C.).

Although the prior art reference (a) above discloses a microcapsule toner comprising a core material composed of releasing materials, such as a silicone oil, since the core material is not mainly composed of thermoplastic resins, the resulting microcapsule toner has poor fixing ability.

The prior art references (b), (c), and (d) each discloses a pressure-fixable encapsulated toner. In general, the toner fixed images obtained simply by pressure-fixing are drastically poor, and particularly when recording media, such as papers, are folded at fixed image portions, for example, the fixed images are likely to be peeled. In cases of pressure-fixable encapsulated toners, since fixing is carried out at a very high nip pressure (for example, 10 kg/cm or more), a tough shell material can be used, and thus liquid materials and silicone oils can be easily sealed in the core material.

However, in an encapsulated toner for heat-and-pressure fixing, since fixing is carried out at a relatively low nip pressure (for example, 3 kg/cm or less), a tough shell material cannot be used therefor. Thus, it has long been considered to be very difficult to incorporate in the encapsulated toner for heat-and-pressure fixing a silicone oil in a molten state at room temperature, because the silicone oil may bleed out from the resulting encapsulated toner upon storage.

Also, in the case where encapsulated toners for heat-and-pressure fixing are produced by using a polyester resin for forming the shell by in situ polymerization while applying the above techniques disclosed, for instance, using a silicone oil having a kinematic viscosity of 500 cSt or more, since the silicone oil does not localize to the vicinity of the surface of the toners, sufficient offset resistance cannot be obtained in the resulting toner. Further, when printing a solid image, scratches are likely to be generated by separator pawl due to its poor releasing ability from the fixing roller.

SUMMARY OF THE INVENTION

In order to solve the above problems, the present inventors have found that by using a silicone oil having a particular kinematic viscosity and utilizing a particular polymerization method, an encapsulated toner for heat-and-pressure fixing having high fixing ability can be produced while incorporating the silicone oil in the core material of the encapsulated toner without causing the bleeding out of the silicone oil upon storage.

Specifically, an object of the present invention is to provide an encapsulated toner for heat-and-pressure fixing obtainable by in situ polymerization method which is industrially advantageous from the aspects of production facilities and production processes, the encapsulated toner having particularly excellent offset resistance and releasing ability, being fixable even at a low temperature, and having excellent blocking resistance when fixing using a heat roller.

Another object of the present invention is to provide a method for producing such an encapsulated toner.

As a result of intensive research in view of solving the above-mentioned problems, the present inventors have found that by selecting conditions for the core materials, including Tg, compositions, and amounts of crosslinking agents, appropriate to meet the requirement of fixing ability and toner-transferring resistance, in which fixed images on a paper are transferred to another paper contacted therewith, and also by adding a low-viscosity silicone oil for improvement of the offset resistance and decrease of the scratches and by using a hydrophilic resin, such as an amorphous polyester, as a shell material of the encapsulated toner, clear visible images free from background for a large amount of copying can be stably formed.

In other words, by controlling the distribution of the low-molecular components and the high-molecular components in the toner, and also by improving releasing properties upon fixing by the addition of a low-viscosity silicone oil, an improvement in the offset resistance and a decreases in scratches can be achieved. Also, by using a shell material composition with a good blocking resistance, the encapsulated toner for heat-and-pressure fixing having excellent offset resistance, fixable at a low temperature, and having excellent storage stability can be provided. The present invention has been completed based upon this finding.

Specifically, the present invention is concerned with the following:

(1) An encapsulated toner for heat-and-pressure fixing comprising a heat-fusible core material containing at least a thermoplastic resin and a coloring agent and a shell comprising a hydrophilic resin formed thereon so as to cover the surface of the core material, wherein the core material contains a silicone oil having a kinematic viscosity of from 10 to 500 cSt at 25° C., and wherein the encapsulated toner is obtainable by in situ polymerization method;

(2) The encapsulated toner for heat-and-pressure fixing described in (1) above, wherein the concentration of oligomer components with 20mers or less in the silicone oil is 1000 ppm or less;

(3) The encapsulated toner for heat-and-pressure fixing described in (1) above, wherein the shell comprises an amorphous polyester as a main component;

(4) The encapsulated toner for heat-and-pressure fixing described in (3) above, wherein the amorphous polyester has a glass transition temperature of from 50° C. to 80° C.;

(5) The encapsulated toner for heat-and-pressure fixing described in (3) or (4) above, wherein the amorphous polyester has an acid value of from 3 to 50 KOH mg/g;

(6) The encapsulated toner for heat-and-pressure fixing described in any one of (1) to (5) above, wherein the glass transition temperature ascribed to a thermoplastic resin used as a main component of the core material is from 10° C. to 50° C.;

(7) A method for producing an encapsulated toner by in situ polymerization method comprising the following steps (a)–(c):
  (a) dissolving an amorphous polyester in a mixture comprising a core material-constituting monomer, a polymerization initiator, a silicone oil, and a coloring agent;
  (b) dispersing the mixture obtained in step (a) in an aqueous dispersant, and localizing the amorphous polyester on the surface of droplets of a core-constituting material to give a polymerizable composition; and
  (c) polymerizing the polymerizable composition obtained in step (b) by in situ polymerization method to form a core material, wherein the core material is covered with a shell comprising the amorphous polyester, thereby giving an encapsulated toner;

(8) The method described in (7) above, further comprising, subsequent to step (c), the following step (d) for carrying out seed polymerization:
  (d) adding at least a vinyl polymerizable monomer and a vinyl polymerization initiator to an aqueous suspension of the encapsulated toner obtained in step (c), wherein the encapsulated toner in step (c) is used as precursor particles for seed polymerization, such that the precursor particles absorb at least the vinyl polymerizable monomer and the vinyl polymerization initiator; and polymerizing at least the vinyl polymerizable monomer in a core portion of the precursor particles, to further form a resin for the core material in the precursor particles;

(9) The method described in (7) or (8) above, wherein the silicone oil has a kinematic viscosity of from 10 to 500 cSt at 25° C.;

(10) The method described in (7) above, wherein the concentration of oligomer components with 20mers or less in the silicone oil is 1000 ppm or less; and

(11) The method described in any one of (7) to (10) above, wherein the amount of the silicone oil is from 0.1 to 10.0 parts by weight, based on 100.0 parts by weight of the resin for the core material.

DETAILED DESCRIPTION OF THE INVENTION

The encapsulated toner for heat-and-pressure fixing of the present invention comprises a heat-fusible core material containing at least a thermoplastic resin and a coloring agent and a shell comprising a hydrophilic resin formed thereon so as to cover the surface of the core material, wherein the core material contains a silicone oil having a kinematic viscosity of from 10 to 500 cSt at 25° C., and wherein the encapsulated toner is obtainable by in situ polymerization method.

Here, "in situ polymerization method" refers to a polymerization method for forming a core-material resin obtainable by polymerizing monomers of the core material resins, polymerization initiators, etc. in the inner portion of the polymerizable composition of which the surface is covered with the shell-forming resin. Since in the method of the present invention, the monomers are supplied only from the inner phase of the dispersed phase, the present method may be a sort of in situ polymerization in a broader sense. Incidentally, the encapsulated toner of the present invention is obtainable singly by in situ polymerization method mentioned above, and it may be also obtainable by a combination of in situ polymerization method and seed polymerization.

The usable silicone oils are not particularly limited as long as they have kinematic viscosities of from 10 to 500 cSt at 25° C., and various silicone oils can be used.

The silicone oils include silicone oils having a dimethylsiloxane structure, silicone oils having a methylphenylsiloxane structure (structure comprising copolymers of dimethyl siloxane and biphenyl siloxane), silicone oils having a monomethylsiloxane structure, silicone oils having a methyl-carboxylsiloxane structure, and modified silicone oils. Examples of highly effective, commercially available products include "KF96-50" (manufactured by Shin-Etsu Chemical Co., Ltd.), "KF96-100" (manufactured by Shin-Etsu Chemical Co., Ltd.), "KF96SS-100" (manufactured by Shin-Etsu Chemical Co., Ltd.), "KF96-300" (manufactured by Shin-Etsu Chemical Co., Ltd.), "KF96SS-300" (manufactured by Shin-Etsu Chemical Co., Ltd.), "KF96-500" (manufactured by Shin-Etsu Chemical Co., Ltd.), "KF-54" (manufactured by Shin-Etsu Chemical Co., Ltd.), "KF-99" (manufactured by Shin-Etsu Chemical Co., Ltd.), "TSF451-50" (manufactured by Toshiba Silicone Corporation), "TSF451-100" (manufactured by Toshiba Silicone Corporation), "TSF451-300" (manufactured by Toshiba Silicone Corporation), "TSF451-350" (manufactured by Toshiba Silicone Corporation), "TSF451-500" (manufactured by Toshiba Silicone Corporation), "TSF4300" (manufactured by Toshiba Silicone Corporation), "L45-50" (manufactured by Nippon Unicar Co., Ltd.), "L45-100" (manufactured by Nippon Unicar Co., Ltd.) "L45-350" (manufactured by Nippon Unicar Co., Ltd.), and "L45-500" (manufactured by Nippon Unicar Co., Ltd.).

These silicone oils may be used in combination of two or more kinds.

The silicone oil has a kinematic viscosity of from 10 to 500 cSt at 25° C., more preferably from 50 to 500 cSt at 25° C., particularly from 100 to 400 cSt at 25° C. When the kinematic viscosity exceeds 500 cSt at 25° C., the silicone oil is less likely to be localized near the surface of the core in the toner upon the production of the toner by in situ polymerization method, and thus the silicone oil is less likely to appear on the toner surface upon fixing of the toner, so that effect of adding the silicone oil cannot be sufficiently exhibited, thereby resulting in poor offset resistance. On the other hand, when the kinematic viscosity is less than 10 cSt at 25° C., the silicone oils are likely to bleed out to the toner surface after the production of the toner, thereby making it likely to deteriorate the storage stability.

In other words, in the encapsulated toner of the present invention, although the silicone oil is contained in the core material and partially in the shell material, when the encapsulated toner is produced by in situ polymerization, the silicone oil is not present on the outermost surface of the toner because the shell material has a higher hydrophilic property. The silicone oil is localized near the surface of a core comprising the core material upon the production of the toner, so that the silicone oil appears to the toner surface upon fixing, thereby giving good offset resistance and releasing ability, and good storage ability.

In addition, from the viewpoint of providing excellent long-term storage stability of the encapsulated toner, the concentration of oligomer components with 20mers or less in the silicone oil is preferably 1000 ppm or less, particularly 800 ppm or less. In other words, by lowering the low-molecular components in the silicone oil, the silicone oil is less liable to bleed out even when the toner is kept standing at a high temperature for a long period of time, thereby showing remarkable improvement in long-term storage stability.

The silicones having a low concentration of the oligomer components with 20mers or less mentioned above can be prepared by heat-treating the silicone oil at a high temperature of 100° C. or higher for several hours to volatilize low-molecular components, thereby lowering the concentration of the oligomer components with 20mers or less in the silicone oil to a level of 1000 ppm or less. The concentration of the oligomer components is evaluated by gas chromatography.

The content of the silicone oil is normally 0.1 to 10.0 parts by weight, preferably 0.5 to 5.0 parts by weight, based on 100.0 parts by weight of the core material resin, within which range good offset resistance and storage stability are likely to be maintained.

The encapsulated toner for heat-and-pressure fixing of the present invention comprises a hydrophilic resin as a shell so as to cover the surface of the core material. Examples of the hydrophilic resins include amorphous polyester resins, polyamide resins, polyesteramide resins, and polyurea resins, which may be added in an amount of 50 to 100% by weight of the entire weight of the shell resin. Among the above hydrophilic resins, a preference is given to an amorphous polyester resin.

The amorphous polyester is usually obtainable by a condensation polymerization between at least one alcohol monomer selected from the group consisting of dihydric alcohol monomers and trihydric or higher polyhydric alcohol monomers and at least one carboxylic acid monomer selected from the group consisting of dicarboxylic acid monomers and tricarboxylic or higher polycarboxylic acid monomers, at least one of the monomers being a trihydric or higher polyhydric alcohol monomer or a tricarboxylic or higher polycarboxylic acid monomer.

Examples of the dihydric alcohol monomers include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxypropylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, propylene adducts of bisphenol A, ethylene adducts of bisphenol A, hydrogenated bisphenol A, and other dihydric alcohol monomers.

Examples of the trihydric or higher polyhydric alcohol monomers include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and other trihydric or higher polyhydric alcohol monomers. Among the alcohol monomers, the trihydric alcohol monomers are preferably used.

In the present invention, these dihydric alcohol monomers and trihydric or higher polyhydric alcohol monomers may be used singly or in combination.

As for the acid components, examples of the dicarboxylic acid monomers include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, n-dodecylsuccinic acid, n-octylsuccinic acid, isooctenylsuccinic acid, isooctylsuccinic acid, acid anhydrides thereof, lower alkyl esters thereof, and other dicarboxylic acid components.

Examples of the tricarboxylic or higher polycarboxylic acid monomers include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, lower alkyl esters thereof, and other tricarboxylic or higher polycarboxylic acid components. In the present invention, among these carboxylic acid components, a preference is given to the tricarboxylic acids and derivatives thereof.

In the present invention, these dicarboxylic acid monomers and tricarboxylic or higher polycarboxylic acid monomers may be used singly or in combination.

The method for producing an amorphous polyester in the present invention is not particularly limited, and the amorphous polyester can be produced by esterification or transesterification of the above monomers.

Here, "amorphous" refers to those which do not have a definite melting point. When a crystalline polyester is used in the present invention, the amount of energy required for fusion is large, and thereby the fixing ability of the toner becomes undesirably poor.

The glass transition temperature of the amorphous polyester thus obtained is preferably 50° to 80° C, more preferably 55° to 75° C. When the glass transition temperature of the amorphous polyester is less than 50° C., the storage stability of the resulting toner becomes poor, and when the glass transition temperature exceeds 80° C., the fixing ability of the resulting toner becomes undesirably poor. In the present invention, the "glass transition temperature" used herein refers to the temperature of an intersection of the extension of the baseline of not more than the glass transition temperature and the tangential line showing the maximum inclination between the kickoff of the peak and the top thereof as determined using a differential scanning calorimeter ("DSC MODEL 220," manufactured by Seiko Instruments, Inc.), at a temperature rise rate of 10° C./min.

The acid value of the above amorphous polyester is preferably 3 to 50 KOH mg/g, more preferably 10 to 30 KOH mg/g. When the acid value is less than 3 KOH mg/g, the amorphous polyester used as the shell-forming material is less likely to be formed on the core material during the seed polymerization, thereby making the storage stability of the resulting toner poor, and when the acid value exceeds 50 KOH mg/g, the polyester is likely to shift to a water phase, thereby making the production stability poor. Here, the acid value is measured by the method according to JIS K0070.

The encapsulated toner whose shell comprises an amorphous polyester suitably used in the present invention is obtainable by forming the shell and the core material by in situ polymerization method. This encapsulated toner comprises a heat-fusible core material comprising at least a thermoplastic resin and a coloring agent and a shell formed thereon so as to cover the surface of the core material.

The resins used as the main components of the heat-fusible core material in the encapsulated toner of the present invention include thermoplastic resins such as polyester-polyamide resins, polyamide resins, and vinyl resins, with a preference given to the vinyl resins. The glass transition temperatures ascribed to the thermoplastic resin used as the main component of the heat-fusible core material mentioned above are preferably from 10° C. to 50° C., more preferably 20° C. to 45° C. When the glass transition temperature is less than 10° C., the storage stability of the encapsulated toner becomes poor, and when it exceeds 50° C., the fixing strength of the encapsulated toner becomes undesirably poor.

Among the above-mentioned thermoplastic resins, examples of the monomers of the vinyl resins include styrene and styrene derivatives such as styrene, o-methylstyrene, m-methylstyrene, p-methylstyrene, α-methylstyrene, p-ethylstyrene, 2,4-dimethylstyrene, p-chlorostyrene, and vinylnaphthalene; ethylenic unsaturated monoolefins such as ethylene, propylene, butylene, and isobutylene; vinyl esters such as vinyl chloride, vinyl bromide, vinyl fluoride, vinyl acetate, vinyl propionate, vinyl formate, and vinyl caproate; ethylenic monocarboxylic acids and esters thereof such as acrylic acid, methyl acrylate, ethyl acrylate, n-propyl acrylate, isopropyl acrylate, n-butyl acrylate, isobutyl acrylate, t-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl a-chloroacrylate, methacrylic acid, methyl methacrylate, ethyl methacrylate, n-propyl methacrylate, isopropyl methacrylate, n-butyl methacrylate, isobutyl methacrylate, t-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, and diethylaminoethyl methacrylate; substituted monomers of ethylenic monocarboxylic acids such as acrylonitrile, methacrylonitrile, and acrylamide; ethylenic dicarboxylic acids and substituted monomers thereof such as dimethyl maleate; vinyl ketones such as vinyl methyl ketone; vinyl ethers such as vinyl methyl ether; vinylidene halides such as vinylidene chloride; and N-vinyl compounds such as N-vinylpyrrole and N-vinylpyrrolidone.

Among the above core material resin components in the present invention, it is preferred that styrene or styrene derivatives is used in an amount of 50 to 90% by weight to form the main structure of the resins, and that the ethylenic monocarboxylic acid or esters thereof is used in an amount of 10 to 50% by weight in order to adjust the thermal properties such as the softening point of the resins, so that the glass transition temperature of the core material resin can be easily controlled.

A crosslinking agent may be added, if necessary, to the monomer composition constituting the core material resins. In such a case, any of the generally known crosslinking agents may be suitably used. Examples of the crosslinking agents added to monomer compositions include divinylbenzene, divinylnaphthalene, polyethylene glycol dimethacrylate, diethylene glycol diacrylate, triethylene glycol diacrylate, 1,3-butylene glycol dimethacrylate, 1,6-hexylene glycol dimethacrylate, neopentyl glycol dimethacrylate, dipropylene glycol dimethacrylate, polypropylene glycol dimethacrylate, 2,2'-bis(4-methacryloxydiethoxyphenyl)propane, 2,2'-bis(4-acryloxydiethoxyphenyl)propane, trimethylolpropane trimethacrylate, trimethylolpropane triacrylate, tetramethylolmethane tetraacrylate, dibromoneopentyl glycol dimethacrylate, and diallyl phthalate. Among them, a preference is given to divinylbenzene and polyethylene glycol dimethacrylate. These crosslinking agents may be used alone or, if necessary, in a combination of two or more.

The amount of these crosslinking agents used is 0.001 to 15% by weight, preferably 0.1 to 10% by weight, based on the polymerizable monomers. When the amount of these crosslinking agents used is more than 15% by weight, the resulting toner is less likely to be melted with heat, thereby resulting in poor heat fixing ability and poor heat-and-pressure fixing ability. On the contrary, when the amount used is less than 0.001% by weight, in the heat-and-pressure fixing, an offset phenomenon is likely to take place wherein a part of the toner cannot be completely fixed on a paper but rather adheres to the surface of a roller, which in turn is transferred to a subsequent paper.

A graft or crosslinked polymer prepared by polymerizing the above monomers in the presence of an unsaturated polyester may be also used as the resin for the core material.

Examples of the polymerization initiators to be used in the production of the thermoplastic resin for the core material include azo and diazo polymerization initiators such as 2,2'-azobis(2,4-dimethylvaleronitrile), 2,2'-azobisisobutyronitrile, 1,1'-azobis(cyclohexane-1-carbonitrile), and 2,2'-azobis-4-methoxy-2,4-dimethylvaleronitrile; and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide, and dicumyl peroxide.

For the purposes of controlling the molecular weight or molecular weight distribution of the polymer or controlling the reaction time, two or more polymerization initiators may be used in combination. The amount of the polymerization initiator used is 0.1 to 20 parts by weight, preferably 1 to 10 parts by weight, based on 100 parts by weight of the polymerizable monomers.

In the present invention, a coloring agent is contained in the core material of the encapsulated toner, and any of the conventional dyes or pigments, which are used for coloring agents for the toners may be used.

Examples of the coloring agents used in the present invention include various carbon blacks which may be produced by a thermal black method, an acetylene black method, a channel black method, and a lamp black method; a grafted carbon black, in which the surface of carbon black is coated with a resin; a nigrosine dye, Phthalocyanine Blue, Permanent Brown FG, Brilliant Fast Scarlet, Pigment Green B, Rhodamine-B Base, Solvent Red 49, Solvent Red 146, Solvent Blue 35, and the mixtures thereof. The coloring agent is usually used in an amount of about 1 to 15 parts by weight based on 100 parts by weight of the resin contained in the core material.

In the present invention, a charge control agent may be further added to the core material. Negative charge control agents to be added are not particularly limited, and examples thereof include azo dyes containing metals such as "VARI-FAST BLACK 3804" (manufactured by Orient Chemical Co., Ltd.), "BONTRON S-31" (manufactured by Orient Chemical Co., Ltd.), "BONTRON S-32" (manufactured by Orient Chemical Co., Ltd.), "BONTRON S-34" (manufactured by Orient Chemical Co., Ltd.), "T-77" (manufactured by Hodogaya Chemical Co., Ltd.), and "AIZEN SPILON BLACK TRH" (manufactured by Hodogaya Chemical Co., Ltd.); copper phthalocyanine dye; metal complexes of alkyl derivatives of salicylic acid such as "BONTRON E-81" (manufactured by Orient Chemical Co., Ltd.), "BONTRON E-82" (manufactured by Orient Chemical Co., Ltd.), and "BONTRON E-85" (manufactured by Orient Chemical Co., Ltd.); quaternary ammonium salts such as "COPY CHARGE NX VP434" (manufactured by Hoechst); and nitroimidazole derivatives, with a preference given to T-77 and AIZEN SPILON BLACK TRH.

The positive charge control agents are not particularly limited, and examples thereof include nigrosine dyes such as "NIGROSINE BASE EX" (manufactured by Orient Chemical Co., Ltd.), "OIL BLACK BS" (manufactured by Orient Chemical Co., Ltd.), "OIL BLACK SO" (manufactured by Orient Chemical Co., Ltd.), "BONTRON N-01" (manufactured by Orient Chemical Co., Ltd.), "BONTRON N-07" (manufactured by Orient Chemical Co., Ltd.), and "BONTRON N-11" (manufactured by Orient Chemical Co., Ltd.); triphenylmethane dyes containing tertiary amines as side chains; quaternary ammonium salt compounds such as "BONTRON P-51" (manufactured by Orient Chemical Co., Ltd.), cetyltrimethylammonium bromide, and "COPY CHARGE PX VP435" (manufactured by Hoechst); polyamine resins such as "AFP-B" (manufactured by Orient Chemical Co., Ltd.); and imidazole derivatives, with a preference given to BONTRON N-07 and AFP-B.

The above charge control agents may be contained in the core material in an amount of 0.1 to 8.0% by weight, preferably 0.2 to 5.0% by weight.

If necessary, the core material may contain one or more suitable offset inhibitors for the purpose of improving the offset resistance in heat-and-pressure fixing, and examples of the offset inhibitors include polyolefins, metal salts of fatty acids, fatty acid esters, partially saponified fatty acid esters, higher fatty acids, higher alcohols, paraffin waxes, amide waxes, polyhydric alcohol esters, silicone varnishes, aliphatic fluorocarbons, and silicone oils.

Examples of the above polyolefins include resins such as polypropylene, polyethylene, and polybutene, which have softening points of from 80° to 160° C. Examples of the above metal salts of fatty acids include metal salts of maleic acid with zinc, magnesium, and calcium; metal salts of stearic acid with zinc, cadmium, barium, lead, iron, nickel, cobalt, copper, aluminum, and magnesium; dibasic lead stearate; metal salts of oleic acid with zinc, magnesium, iron, cobalt, copper, lead, and calcium; metal salts of palmitic acid with aluminum and calcium; caprylates; lead caproate; metal salts of linoleic acid with zinc and cobalt; calcium ricinoleate; metal salts of ricinoleic acid with zinc and cadmium; and mixtures thereof. Examples of the above fatty acid esters include ethyl maleate, butyl maleate, methyl stearate, butyl stearate, cetyl palmitate, and ethylene glycol montanate. Examples of the above partially saponified fatty acid esters include montanic acid esters partially saponified with calcium. Examples of the above higher fatty acids include dodecanoic acid, lauric acid, myristic acid, palmitic acid, stearic acid, oleic acid, linoleic acid, ricinoleic acid, arachic acid, behenic acid, lignoceric acid, selacholeic acid, and mixtures thereof. Examples of the above higher alcohols include dodecyl alcohol, lauryl alcohol, myristyl alcohol, palmityl alcohol, stearyl alcohol, arachyl alcohol, and behenyl alcohol. Examples of the above paraffin waxes include natural paraffins, microcrystalline waxes, synthetic paraffins, Fischer Tropsch wax, and chlorinated hydrocarbons. Examples of the above amide waxes include stearamide, oleamide, palmitamide, lauramide, behenamide, methylenebisstearamide, ethylenebisstearamide, N,N'-m-xylylenebisstearamide, N,N'-m-xylylenebis-12-hydroxystearamide, N,N'-isophthalic bisstearylamide, and N,N'-isophthalic bis-12-hydroxystearylamide. Examples of the above polyhydric alcohol esters include glycerol stearate, glycerol ricinolate, glycerol monobehenate, sorbitan monostearate, propylene glycol monostearate, and sorbitan trioleate. Examples of the above silicone varnishes include methylsilicone varnish and phenylsilicone varnish. Examples of the above aliphatic fluorocarbons include low polymerized compounds of tetrafluoroethylene and hexafluoropropylene, and fluorinated surfactants disclosed in Japanese Patent Laid-Open No. 53-124428. Among the above offset inhibitors, a preference is given to polypropylene and Fischer Tropsch wax, with a particular preference given to polypropylene.

It is preferable to use the offset inhibitors in a proportion of 1 to 20% by weight, based on the resin contained in the core material.

Next, the method for production of the encapsulated toner of the present invention will be explained in detail below. The toners of the present invention are produced by in situ polymerization method from the viewpoints of simplicity in the production facilities and the production steps.

The method for producing an encapsulated toner for heat-and-pressure fixing of the present invention comprises the following steps (a) to (c):

(a) dissolving an amorphous polyester in a mixture comprising a core material-constituting monomer, a polymerization initiator, a silicone oil, and a coloring agent;

(b) dispersing the mixture obtained in step (a) in an aqueous dispersant, and localizing the amorphous polyester on the surface of droplets of a core-constituting material to give a polymerizable composition; and (c) polymerizing the polymerizable composition obtained in step (b) by in situ polymerization method to form a core material, wherein the core material is covered with a shell comprising the amorphous polyester, thereby giving an encapsulated toner.

For the similar reasons given above, the silicone oil has a kinematic viscosity preferably from 10 to 500 cSt at 25° C., more preferably from 50 to 500 cSt at 25° C., particularly from 100 to 400 cSt at 25° C.

In addition, the silicone oil may be added while blending it together with core-constituting monomers, a polymerization initiator, and a coloring agent, thereby dissolving the silicone oil by stirring the mixture.

In the method for production of the encapsulated toner, the shell can be formed by utilizing the property that when a mixed solution comprising the core-constituting materials and the shell-forming material comprising an amorphous polyester is dispersed in an aqueous dispersant, the shell-forming material localizes onto the surface of the liquid droplets. Specifically, the separation of the core-constituting materials and the shell-forming material in the liquid droplets of the mixed solution takes place due to the difference in the solubility indices, and the polymerization proceeds in this state to form core material resin and at the same time to form a shell, and thereby an encapsulated structure is formed. By this method, a shell is formed as a layer of the amorphous polyester with a substantially uniform thickness, so that the triboelectric chargeability of the toner becomes uniform.

Incidentally, a general method of encapsulation by in situ polymerization is carried out by supplying monomers for shell-forming resins, polymerization initiators, etc. from either one of the inner phase or outer phase of the dispersed phase and forming a shell resin by polymerization to give an encapsulated structure (see *Microcapsule*, T. Kondo and N. Koishi, 1987, published by Sankyo Shuppan Kabushiki Kaisha). On the other hand, in in situ polymerization in the present invention, since the core material resin is formed in the inner portion of the shell resin by polymerizing monomers for the core material resins, the encapsulation mechanism in the present invention is somewhat different from that of the general encapsulation in in situ polymerization method. However, since in the method of the present invention, the monomers are supplied only from the inner phase of the dispersed phase, the present method may be a sort of in situ polymerization in a broader sense.

When the encapsulated toner is produced by the above method, a dispersion stabilizer is added into the dispersion medium in order to prevent aggregation and incorporation of the dispersed substances.

Examples of the dispersion stabilizers include gelatin, gelatin derivatives, polyvinyl alcohols, polystyrenesulfonic acid, hydroxymethylcellulose, hydroxyethylcellulose, hydroxypropylcellulose, sodium carboxymethylcellulose, sodium polyacrylate, sodium dodecylbenzenesulfonate, sodium tetradecyl sulfate, sodium pentadecyl sulfate, sodium octyl sulfate, sodium allyl alkyl polyethersulfonate, sodium oleate, sodium laurate, sodium caprate, sodium caprylate, sodium caproate, potassium stearate, calcium oleate, sodium 3,3-disulfonediphenylurea-4,4-diazobisamino-β-naphthol-6-sulfonate, o-carboxybenzeneazodimethylaniline, sodium 2 2,5,5-tetramethyltriphenylmethane-4,4-diazobis-β-naphtholdisulfonate, colloidal silica, alumina, tricalcium phosphate, ferric hydroxide, titanium hydroxide, and aluminum hydroxide, with a preference given to tricalcium phosphate. These dispersion stabilizers may be used alone or in combination of two or more.

Examples of the dispersion media include water, methanol, ethanol, propanol, butanol, ethylene glycol, glycerol, acetonitrile, acetone, isopropyl ether, tetrahydrofuran, and dioxane, among which water is preferably used as an essential component. These dispersion media can be used singly or in combination.

In the method for producing the encapsulated toner in the present invention, the amount of the above amorphous polyester resin as a main component is normally 3 to 50 parts by weight, preferably 5 to 40 parts by weight, more preferably 6 to 30 parts by weight, based on 100 parts by weight of the core material. When the amount of the amorphous polyester resin is less than 3 parts by weight, the resulting shell becomes too thin in its thickness, thereby making the storage stability of the toner poor. When the amount exceeds 50 parts by weight, the droplets dispersed in the aqueous dispersant have an undesirably high viscosity, thereby making it difficult to produce fine grains, which in turn results in poor production stability.

In present invention, the encapsulated toner produced by the method explained above may be used as precursor particles, and seed polymerization may be further carried out using the precursor particles, to give an encapsulated toner for heat-and-pressure fixing according to Second Embodiment. Therefore, in the present invention, there are two preferred embodiments for the encapsulated toners of the present invention: One wherein the encapsulated toner is produced by in situ polymerization alone, and another wherein the encapsulated toner is produced by a combination of in situ polymerization and seed polymerization.

The seed polymerization in the present invention comprises the steps of adding at least a vinyl polymerizable monomer and a vinyl polymerization initiator to an aqueous suspension of the encapsulated toner produced by the in situ polymerization method explained above (hereinafter the encapsulated toner obtainable by in situ polymerization method may be simply referred to as "precursor particles") such that the precursor particles absorb the added monomer components; and polymerizing the vinyl polymerizable monomer in the above precursor particles.

For instance, when the precursor particles are produced by in situ polymerization method described above, at least a vinyl polymerizable monomer and an initiator for vinyl polymerization are immediately added to the precursor particles in a suspending state, and the monomer and the initiator are absorbed into the precursor particles, so that seed polymerization takes place with the monomer components absorbed in the precursor particles. By this method, the production steps can be simplified. The vinyl polymerizable monomers, etc. which are added to be absorbed into the precursor particles may be used in a state of an aqueous emulsion.

The aqueous emulsion to be added can be obtained by emulsifying and dispersing the vinyl polymerizable monomer and the initiator for vinyl polymerization in water together with a dispersion stabilizer, which may further contain other additives such as a crosslinking agent, an offset inhibitor, and a charge control agent.

The vinyl polymerizable monomers used in the seed polymerization may be the same ones as those used for the production of the precursor particles mentioned above. Also, the initiators for vinyl polymerization, the crosslinking agents, and the dispersion stabilizers may also be the same ones as those used for the production of the precursor particles mentioned above. The amount of the crosslinking agent used in the seed polymerization is preferably 0.001 to 15% by weight, more preferably 0.1 to 10% by weight, based on the vinyl polymerizable monomers. When the amount of these crosslinking agents used is more than 15% by weight, the resulting toner is less likely to be melted with heat, thereby resulting in poor heat fixing ability and poor heat-and-pressure fixing ability. On the contrary, when the amount used is less than 0.001% by weight, in the heat-and-pressure fixing, an offset phenomenon is likely to take place wherein a part of the toner cannot be completely fixed on a paper but rather adheres to the surface of a roller, which in turn is transferred to a subsequent paper.

In order to further improve the storage stability of the toner, the amorphous polyester described above may be added to the aqueous emulsion. In this case, the amount of the amorphous polyester is normally 1 to 20 parts by weight, preferably 3 to 15 parts by weight, based on 100 parts by weight of the core material. The aqueous emulsion described above can be prepared by uniformly dispersing the mixture using such devices as an ultrasonic vibrator.

The acid value of the amorphous polyester used in the seed polymerization, as in the case of that used in in situ polymerization reaction, is preferably 3 to 50 KOH mg/g, more preferably 10 to 30 KOH mg/g. When the acid value of the amorphous polyester is less than 3 KOH mg/g, the amorphous polyester used as the shell-forming material is less likely to be formed on the core material during the seed polymerization, thereby making the storage stability of the resulting toner poor, and when the acid value exceeds 50 KOH mg/g, the polyester is likely to shift to a water phase, thereby making the production stability poor. Here, the acid value is measured by the method according to JIS K0070.

The amount of the aqueous emulsion added is adjusted so that the amount of the vinyl polymerizable monomer used is 10 to 200 parts by weight, based on 100 parts by weight of the precursor particles. When the amount of the vinyl polymerizable monomer is less than 10 parts by weight, sufficient effects for improving the fixing ability of the resulting toner cannot be achieved, and when the amount exceeds 200 parts by weight, it would be difficult to uniformly absorb the monomer components in the precursor particles.

By the addition of the aqueous emulsion, the vinyl polymerizable monomer is absorbed into the precursor particles so that the swelling of the precursor particles takes place. In the seed polymerization reaction, the monomer components in the precursor particles are polymerized in the above state. This polymerization may be referred to as "seed polymerization," wherein the precursor particles are used as seed particles.

As explained above, the following features are improved when compared with the case where the encapsulated toner is produced solely by in situ polymerization method.

Specifically, the encapsulated toner produced by in situ polymerization method has more excellent low-temperature fixing ability and storage stability than conventional toners, and by further carrying out the seed polymerization method, a shell is formed more uniformly by the principle of surface science, thereby achieving a further excellent storage stability of the resulting toner. Also, since the polymerizable monomers in the core material can be polymerized in two steps, namely, in situ polymerization reaction and the seed polymerization reaction, the molecular weight of the thermoplastic resin in the core material can be easily controlled by using a suitable amount of the crosslinking agent, thereby making the low-temperature fixing ability and the offset resistance more excellent. In particular, a toner suitable not only for a high-speed fixing but also for a low-speed fixing can be produced.

In addition, for the purpose of charge control, the charge control agents exemplified above may be properly added to the shell-forming materials of the encapsulated toner of the present invention. Alternatively, the charge control agent may be used in a mixture with a toner. Since the shell itself controls chargeability, the amount of these charge control agents, if needed, can be minimized.

Although the particle size of the encapsulated toner produced by the method described above is not particularly limitative, the average particle size is usually 3 to 30 µm. The thickness of the shell of the encapsulated toner is preferably 0.01 to 1 µm. When the thickness of the shell is less than 0.01 µm, the blocking resistance of the resulting toner becomes poor, and when it exceeds 1 µm, the heat fusibility of the resulting toner becomes undesirably poor.

In the encapsulated toner of the present invention, a fluidity improver, or a cleanability improver may be used, if necessary. Examples of the fluidity improvers include silica, alumina, titanium oxide, barium titanate, magnesium titanate, calcium titanate, strontium titanate, zinc oxide, quartz sand, clay, mica, wollastonite, diatomaceous earth, chromium oxide, cerium oxide, red oxide, antimony trioxide, magnesium oxide, zirconium oxide, barium sulfate, barium carbonate, calcium carbonate, silicon carbide, and silicon nitride, with a preference given to finely powdered silica.

The finely powdered silica is a fine powder having Si—O—Si linkages, which may be prepared by either the dry process or the wet process. The finely powdered silica may be not only anhydrous silicon dioxide but also any one of aluminum silicate, sodium silicate, potassium silicate, magnesium silicate, and zinc silicate, with a preference given to those containing 85% by weight or more of $SiO_2$. Further, finely powdered silica surface-treated with a silane coupling agent, a titanium coupling agent, silicone oil, and silicone oil having amine in the side chain thereof can be used.

The cleanability improvers include fine powders of metal salts of higher fatty acids typically exemplified by zinc stearate or fluorocarbon polymers.

Further, for the purpose of controlling the developability of the encapsulated toner, finely powdered polymers of methyl methacrylate or butyl methacrylate may be added.

Furthermore, for the purpose of toning or reducing electric resistance on the surface of the toner, a small amount of carbon black may be used. The carbon blacks may be those of conventionally known, including various kinds such as furnace black, channel black, and acetylene black.

When the encapsulated toner of the present invention contains particulate magnetic materials, it can be used alone as a developer, while when the encapsulated toner does not contain any particulate magnetic material, a non-magnetic one-component developer or a two-component developer can be prepared by mixing the toner with a carrier. Although the carrier is not particularly limitative, examples thereof include iron powder, ferrite, glass beads, those of above with resin coatings, and resin carriers in which magnetite fine powders or ferrite fine powders are blended into the resins. The mixing ratio of the toner to the carrier is 0.5 to 20% by weight. The particle size of the carrier is 15 to 500 µm.

When the encapsulated toner of the present invention is fixed on a recording medium such as paper by heat and pressure, an excellent fixing strength is attained. As for the heat-and-pressure fixing process to be suitably used in the fixing of the toner of the present invention, any one may be used as long as both heat and pressure are utilized. Examples of the fixing processes which can be suitably used in the present invention include a known heat roller fixing process; a fixing process as disclosed in Japanese Patent Laid Open No. 2-190870 in which visible images formed on a recording medium in an unfixed state are fixed by heating and fusing the visible images through the heat-resistant sheet with a heating means, comprising a heating portion and a heat-resistant sheet, thereby fixing the visible images onto the recording medium; and a heat-and-pressure process as disclosed in Japanese Patent Laid-Open No. 2-162356 in which the formed visible images are fixed on a recording medium through a film by using a heating element fixed to a support and a pressing member arranged opposite to the heating element in contact therewith under pressure.

The encapsulated toner for heat-and-pressure fixing of the present invention has excellent offset resistance and releasing ability, is fixable even at a low temperature, and has excellent blocking resistance when heat-and-pressure fixing using a heat roller, so that clear visible images free from background for a large amount of copying can be stably formed.

EXAMPLES

The present invention is hereinafter described in more detail by means of the following working resin production example, examples, comparative examples, and test example, but the present invention is not limited by these examples.

Resin Production Example 367.5 g of a propylene oxide adduct of bisphenol A, 146.4 g of an ethylene oxide adduct of bisphenol A, 126.0 g of terephthalic acid, 40.2 g of dodecenylsuccinic anhydride, and 77.7 g of trimellitic anhydride were placed in a two-liter four-necked glass flask equipped with a thermometer, a stainless steel stirring rod, a reflux condenser, and a nitrogen inlet tube, and the components were allowed to react with one another at 220° C. in a mantle heater under a nitrogen gas stream while stirring.

The degree of polymerization was monitored from a softening point measured according to ASTM E 28-67, and the reaction was terminated when the softening point reached 110° C. The obtained resin is referred to as "Resin A."

Also, the glass transition temperature of the obtained resin was measured by the differential scanning calorimeter ("DSC Model 220," manufactured by Seiko Instruments, Inc.). As a result, the glass transition temperature was 65° C. Also, the softening point and the acid value were measured, and the respective values were 110° C. and 18 KOH mg/g. The acid value was measured by the method according to JIS K0070.

In the present invention, the "softening point" used herein referred to the temperature corresponding to one-half of the height (h) of the S-shaped curve showing the relationship between the downward movement of a plunger (flow length) and temperature, when measured by using a flow tester of the "koka" type manufactured by Shimadzu Corporation in which a 1 $cm^3$ sample was extruded through a nozzle having a dice pore size of 1 mm and a length of 1 mm, while heating the sample so as to raise the temperature at a rate of 6° C./min and applying a load of 20 $kg/cm^2$ thereto with the plunger.

Example 1

20.0 parts by weight of Resin A and 3.5 parts by weight of 2,2'-azobisisobutyronitrile were added to a mixture comprising 69.0 parts by weight of styrene, 31.0 parts by weight of 2-ethylhexyl acrylate, 0.9 parts by weight of divinylbenzene, 7.0 parts by weight of carbon black "#44"

(manufactured by Mitsubishi Kasei Corporation), and 2.0 parts by weight of a silicone oil "KF96-50" (manufactured by Shin-Etsu Chemical Co., Ltd.; dimethylsiloxane structure; kinematic viscosity 50 cSt). The obtained mixture was introduced into an attritor ("Model MA-O1SC," manufactured by Mitsui Miike Kakoki) and dispersed at 10° C. for 5 hours to give a polymerizable composition.

Next, 240 g of the above polymerizable composition was added to 560 g of a 4% by weight aqueous colloidal solution of tricalcium phosphate which was previously prepared in a two-liter separable glass flask. The obtained mixture was emulsified and dispersed with "T. K. HOMO MIXER, Model M" (manufactured by Tokushu Kika Kogyo) at a temperature of 15° C. and a rotational speed of 12000 rpm for 5 minutes.

Next, a four-necked glass cap was set on the flask, and a reflux condenser, a thermometer, a nitrogen inlet tube, and a stainless steel stirring rod were attached thereto. The flask was placed in an electric mantle heater. Thereafter, the contents were allowed to react with one another at 85° C. for 10 hours in a nitrogen atmosphere while stirring. After the reaction product was cooled, the dispersing agent was dissolved in 10% by weight-aqueous hydrochloric acid. The resulting product was filtered, and the obtained solid was washed with water, air-dried, subsequently dried under a reduced pressure of 20 mmHg at 45° C. for 12 hours, and then classified with an air classifier to give an encapsulated toner with an average particle size of 8 µm whose shell comprised an amorphous polyester.

To 100 parts by weight of this encapsulated toner, 0.4 parts by weight of hydrophobic silica fine powder "AEROZIL R-972" (manufactured by Nippon Aerozil Ltd.) were added and mixed to give an encapsulated toner according to the present invention. This toner is referred to as "Toner 1." The glass transition temperature ascribed to the resin contained in the core material was 30.6° C., and the softening point of Toner 1 was 125.5° C.

Example 2

15.0 parts by weight of Resin A were added to a mixture comprising 72.0 parts by weight of styrene, 28.0 parts by weight of 2-ethylhexyl acrylate, 6.0 parts by weight of 2,2'-azobisisobutyronitrile, 3.0 parts by weight of a silicone oil "KF96-100" (manufactured by Shin-Etsu Chemical Co., Ltd.; dimethylsiloxane structure; kinematic viscosity 100 cSt), and 3.5 parts by weight of a wax "SPRAY 105" (manufactured by Sasol Waxes), and Resin A was dissolved in the mixture. After Resin A was completely dissolved, 20.0 parts by weight of grafted carbon black "505-P" (manufactured by Ryoyu Kogyo) were added thereto, and the resulting mixture was dispersed for one hour using a magnetic stirrer to give a polymerizable composition.

Next, 240 g of the above polymerizable composition was added to 560 g of a 4% by weight aqueous colloidal solution of tricalcium phosphate which was previously prepared in a two-liter separable glass flask. The obtained mixture was emulsified and dispersed with "T. K. HOMO MIXER, Model M" (manufactured by Tokushu Kika Kogyo) at a temperature of 15° C. and a rotational speed of 12000 rpm for 5 minutes.

Next, a four-necked glass cap was set on the flask, and a reflux condenser, a thermometer, a nitrogen inlet tube, and a stainless steel stirring rod were attached thereto. The flask was placed in an electric mantle heater. Thereafter, as a first-step reaction, the contents were allowed to react with one another at 85° C. for 10 hours in a nitrogen atmosphere while stirring to give seed particles. The seed particles were cooled to room temperature to give precursor particles of the toner.

Next, 123.0 parts by weight of an aqueous emulsion comprising 28.8 parts by weight of styrene, 11.2 parts by weight of 2-ethylhexyl acrylate, 2.4 parts by weight of 2,2'-azobisisobutyronitrile, 0.4 parts by weight of divinylbenzene, 0.2 parts by weight of sodium laurylsulfate, and 80.0 parts by weight of water were added dropwise to an aqueous suspension containing the above precursor particles, the emulsion being prepared by an ultrasonic vibrator ("US-150," manufactured by Nippon Seiki Co., Ltd.). Thereafter, as a second-step polymerization, the contents were allowed to react with one another at 85° C. for 10 hours in a nitrogen atmosphere while stirring. After the reaction product was cooled, the dispersing agent was dissolved in 10%-aqueous hydrochloric acid. The resulting product was filtered, and the obtained solid was washed with water, air-dried, subsequently dried under a reduced pressure of 20 mmHg at 45° C. for 12 hours, and then classified with an air classifier to give an encapsulated toner with an average particle size of 8 µm whose shell comprised an amorphous polyester.

To 100.0 parts by weight of this encapsulated toner, 0.4 parts by weight of hydrophobic silica fine powder "Aerozil R-972" (manufactured by Nippon Aerozil Ltd.) were added and mixed to give an encapsulated toner according to the present invention. This toner is referred to as "Toner 2." The glass transition temperature ascribed to the resin contained in the core material was 39.5° C., and the softening point of Toner 2 is 112.1° C.

Example 3

15.0 parts by weight of Resin A were added to a mixture comprising 72.0 parts by weight of styrene, 28.0 parts by weight of 2-ethylhexyl acrylate, 6.0 parts by weight of 2,2'-azobisisobutyronitrile, 3.0 parts by weight of a silicone oil "KF96-500" (manufactured by Shin-Etsu Chemical Co., Ltd.; dimethylsiloxane structure; kinematic viscosity 500 cSt), and 3.5 parts by weight of a wax "SPRAY 105" (manufactured by Sasol Waxes), and Resin A was dissolved in the mixture. After Resin A was completely dissolved, 20.0 parts by weight of grafted carbon black "505-P" (manufactured by Ryoyu Kogyo) were added thereto, and the resulting mixture was dispersed for one hour using a magnetic stirrer to give a polymerizable composition.

Next, 240 g of the above polymerizable composition was added to 560 g of a 4% by weight aqueous colloidal solution of tricalcium phosphate which was previously prepared in a two-liter separable glass flask. The obtained mixture was emulsified and dispersed with "T. K. HOMO MIXER, Model M" (manufactured by Tokushu Kika Kogyo) at a temperature of 15° C. and a rotational speed of 12000 rpm for 5 minutes.

Next, a four-necked glass cap was set on the flask, and a reflux condenser, a thermometer, a nitrogen inlet tube, and a stainless steel stirring rod were attached thereto. The flask was placed in an electric mantle heater. Thereafter, as a first-step reaction, the contents were allowed to react with one another at 85° C. for 10 hours in a nitrogen atmosphere while stirring to give seed particles. The seed particles were cooled to room temperature to give precursor particles of the toner.

Next, 123.0 parts by weight of an aqueous emulsion comprising 28.8 parts by weight of styrene, 11.2 parts by weight of 2-ethylhexyl acrylate, 2.4 parts by weight of 2,2'-azobisisobutyronitrile, 0.4 parts by weight of divinylbenzene, 0.2 parts by weight of sodium laurylsulfate, and 80.0 parts by weight of water were added dropwise to an aqueous suspension containing the above precursor particles, the emulsion being prepared by a ultrasonic vibrator ("US-150," manufactured by Nippon Seiki Co., Ltd.). Thereafter, as a second-step polymerization, the contents were allowed to react with one another at 85° C. for 10 hours in a nitrogen atmosphere while stirring. After the reaction product was cooled, the dispersing agent was dissolved in 10%-aqueous hydrochloric acid. The resulting product was filtered, and the obtained solid was washed with water, and air-dried, subsequently dried under a reduced pressure of 20 mmHg at 45° C. for 12 hours, and then classified with an air classifier to give an encapsulated toner with an average particle size of 8 μm whose shell comprised an amorphous polyester To 100 parts by weight of this encapsulated toner, 0.4 parts by weight of hydrophobic silica fine powder "Aerozil R-972" (manufactured by Nippon Aerozil Ltd.) were added and mixed to give an encapsulated toner according to the present invention. This toner is referred to as "Toner 3." The glass transition temperature ascribed to the resin contained in the core material was 41.2° C., and the softening point of Toner 3 is 114.4° C.

Example 4

The similar procedures to those of Example 3 were carried out up to the surface treatment step except that the silicone oil "KF96-500" was replaced with silicone oil "KF-54" (manufactured by Shin-Etsu Chemical Co., Ltd.; methyl-phenylsiloxane structure; kinematic viscosity 400 cSt), to give an encapsulated toner according to the present invention.

This toner is referred to as "Toner 4." The glass transition temperature ascribed to the resin contained in the core material was 40.5° C., and the softening point of Toner 4 was 113.0° C.

Example 5

The similar procedures to those of Example 2 were carried out up to the surface treatment step except that the silicone oil "KF96-100" was replaced with silicone oil "KF96SS-100" (manufactured by Shin-Etsu Chemical Co., Ltd.; dimethylsiloxane structure; kinematic viscosity 100 cSt), to give an encapsulated toner according to the present invention.

This toner is referred to as "Toner 5." The glass transition temperature ascribed to the resin contained in the core material was 39.8° C., and the softening point of Toner 5 was 112.8° C.

Example 6

The similar procedures to those of Example 2 were carried out up to the surface treatment step except that the silicone oil "KF96-100" was replaced with silicone oil "KF96-300" (manufactured by Shin-Etsu Chemical Co., Ltd.; dimethylsiloxane structure; kinematic viscosity 300 cSt), to give an encapsulated toner according to the present invention.

This toner is referred to as "Toner 6." The glass transition temperature ascribed to the resin contained in the core material was 40.5° C., and the softening point of Toner 6 was 113.0° C.

Example 7

The similar procedures to those of Example 2 were carried out up to the surface treatment step except that the silicone oil "KF96-100" was replaced with silicone oil "KF96SS-300" (manufactured by Shin-Etsu Chemical Co., Ltd.; dimethylsiloxane structure; kinematic viscosity 300 cSt), to give an encapsulated toner according to the present invention.

This toner is referred to as "Toner 7." The glass transition temperature ascribed to the resin contained in the core material was 40.7° C., and the softening point of Toner 7 was 113.3° C.

Comparative Example 1

The similar procedures to those of Example 1 were carried out up to the surface treatment step except for eliminating the silicone oil "KF96-50," to give a comparative encapsulated toner.

This toner is referred to as "Comparative Toner 1." The glass transition temperature ascribed to the resin contained in the core material was 31.0° C., and the softening point of Comparative Toner 1 was 127.3° C.

Comparative Example 2

The similar procedures to those of Example 2 were carried out up to the surface treatment step except for eliminating the silicone oil "KF96-100" during the production of the precursor particles of the seed particles, to give a comparative encapsulated toner.

This toner is referred to as "Comparative Toner 2." The glass transition temperature ascribed to the resin contained in the core material was 41.8° C., and the softening point of Comparative Toner 2 was 116.6° C.

Comparative Example 3

The similar procedures to those of Example 2 were carried out up to the surface treatment step except that the silicone oil "KF96-100" was replaced with silicone oil "KF96-1000" (manufactured by Shin-Etsu Chemical Co., Ltd.; dimethylsiloxane structure; kinematic viscosity 1000 cSt), to give a comparative encapsulated toner.

This toner is referred to as "Comparative Toner 3." The glass transition temperature ascribed to the resin contained in the core material was 41.5° C., and the softening point of Comparative Toner 3 was 115.5° C.

Comparative Example 4

The similar procedures to those of Example 2 were carried out up to the surface treatment step except that the silicone oil "KF96-100" was replaced with silicone oil "KF96-10000" (manufactured by Shin-Etsu Chemical Co., Ltd.; dimethylsiloxane structure; kinematic viscosity 10000 cSt), to give a comparative encapsulated toner.

This toner is referred to as "Comparative Toner 4." The glass transition temperature ascribed to the resin contained in the core material was 41.0° C., and the softening point of Comparative Toner 4 was 114.7° C.

Comparative Example 5

The similar procedures to those of Example 4 were carried out up to the surface treatment step except that the silicone oil "KF-54" was replaced with silicone oil "KF50-3000" (manufactured by Shin-Etsu Chemical Co., Ltd.; methyl-phenylsiloxane structure; kinematic viscosity 3000 cSt), to give a comparative encapsulated toner.

This toner is referred to as "Comparative Toner 5." The glass transition temperature ascribed to the resin contained in the core material was 40.8° C., and the softening point of Comparative Toner 5 was 115.1° C.

Test Example

Each of the developers was prepared by placing 6 parts by weight of each of the toners obtained in Examples and Comparative Examples and 94 parts by weight of spherical ferrite powder coated with styrene-methyl methacrylate copolymer resin having a particle size of 250 mesh-pass and 400 mesh-on into a polyethylene container, and mixing the above components by rotation of the container on the roller at a rotational speed of 150 rpm for 20 minutes. The developer was evaluated by the methods detailed below.

(1) Triboelectric charge

The triboelectric charge was measured by a blow-off type electric charge measuring device as described below. Specifically, a specific charge measuring device equipped with a Faraday cage, a capacitor and an electrometer was used. First, W (g) (about 0.15 to 0.20 g) of the developer prepared above was placed into a brass measurement cell equipped with a stainless screen of 500 mesh, which was adjustable to any mesh size to block the passing of the carrier particles. Next, after aspirating from a suction opening for 5 seconds, blowing was carried out for 5 seconds under a pressure indicated by a barometric regulator of 0.6 kgf/cm², thereby selectively removing only the toner from the cell.

In this case, the voltage of the electrometer after 2 seconds from the start of blowing was defined as V (volt). Here, when the electric capacitance of the capacitor was defined as C (μF), the triboelectric charge Q/m of this toner was calculated by the following equation:

$$Q/m \ (\mu C/g) = C \times V/m$$

Here, m was the weight of the toner contained in W (g) of the developer. When the weight of the toner in the developer was defined as T (g) and the weight of the developer as D (g), the toner concentration in a given sample was expressed as T/D×100(%), and m was calculated as shown in the following equation:

$$m \ (g) = W \times (T/D)$$

The measurement results of the triboelectric charge of the developer prepared under normal conditions were shown in Table 1.

(2) Storage stability

Also, the storage stability was evaluated by the extent of generation of cohesiveness after keeping the Toners 1 to 4 and Comparative Toners 1 to 5 standing under the conditions of 50° C. for 24 hours by gross examination and palpation. The results are also shown in Table 1.

(3) Fixing ability

The fixing ability was evaluated by the method as described below. Specifically, each of the developers prepared as described above was loaded on a commercially available electrophotographic copy machine to develop images. The copy machine was equipped with a selene-arsenic photoconductor and a fixing roller having a rotational speed of 255 mm/sec. By controlling the fixing temperature from 70° C. to 240° C., the fixing ability and the offset resistance of the formed images were evaluated. The results are shown in Table 1.

The lowest fixing temperature used herein was the temperature of the fixing roller at which the fixing ratio of the toner exceeds 70%. This fixing ratio of the toner was determined by placing a load of 500 g on a sand-containing rubber eraser (LION No. 502) having a bottom area of 15 mm×7.5 mm which contacted the fixed toner image, placing the loaded eraser on a fixed toner image obtained in the fixing device, moving the loaded eraser on the image backward and forward five times, measuring the optical reflective density of the eraser-treated image with a reflective densitometer manufactured by Macbeth Process Measurements Co., and then calculating the fixing ratio from this density value and a density value before the eraser treatment using the following equation.

$$\text{Fixing ratio} = \frac{\text{Image density after eraser treatment}}{\text{Image density before eraser treatment}}$$

The offset resistance was evaluated by measuring the temperature of the low-temperature offset disappearance and the temperature of the high-temperature offset initiation. Specifically, copying tests were carried out by raising the temperature of the heat roller surface at an increment of 5° C. in the range from 70° C. to 240° C., and at each temperature, the adhesion of the toner onto the heat roller surface for fixing is evaluated by gross examination. The results are shown in Table 1.

(4) Scratches Remaining on Solid Portion

The scratches remaining on the solid portion largely affected by releasing properties was evaluated by a fixing test using a commercially available electrophotographic copy machine equipped with a selene-arsenic photoconductor and a fixing roller having a rotational speed of 255 mm/sec, and observing the solid portion of the chart after fixing. Here, the evaluation was made by the following ranks:

o: No scratches remained in the entire temperature ranges.

Δ: Scratches remained in a part of the temperature ranges.

x: Scratches remained in the entire temperature ranges.

The results are shown in Table 1.

(5) Long-Term Storage Stability

The long-term storage stability was evaluated by the extent of generation of cohesiveness after keeping the Toners 2, 5, 6, and 7 standing under the conditions of 50° C. for one month by gross examination and palpation. The results are also shown in Table 2 together with storage stability under the conditions of 50° C. for 24 hours.

Incidentally, the concentration of the oligomer components with 20 mer or less in each of the silicone oils was measured by gas chromatography. The results are shown in Table 2.

TABLE 1

|  | Triboelectric Charges (μC/g) | Storage Stability (50° C., 24 hr.) | Fixing Ability Lowest Fixing Temp. (°C.) | Fixing Ability Non-Offset Region (°C.) | Scratches Remaining on Solid Portion |
|---|---|---|---|---|---|
| Toner 1 | −25 | Good | 100 | 80–200 | ○ |
| Toner 2 | −27 | Good | 85 | 80–240 | ○ |
| Toner 3 | −27 | Good | 85 | 80–220 | ○ |
| Toner 4 | −26 | Good | 85 | 80–240 | ○ |
| Comparative Toner 1 | −26 | Good | 105 | 80–140 | x |
| Comparative Toner 2 | −27 | Good | 90 | 80–160 | x |
| Comparative Toner 3 | −27 | Good | 85 | 80–200 | Δ |
| Comparative Toner 4 | −27 | Good | 90 | 80–170 | Δ |
| Comparative Toner 5 | −27 | Good | 90 | 80–180 | Δ |

TABLE 2

| Toners | Type of Silicone Oil Used | Concentration of Oligomer Component with 20mers or Less in Silicone Oil | Storage Stability (50° C., 24 hr) | Storage Stability (50° C., 1 mon.) |
|---|---|---|---|---|
| Toner 2 | "KF96-100" | 25000 ppm | Good | Slightly Aggregated |
| Toner 5 | "KF96SS-100" | 720 ppm | Good | Good |
| Toner 6 | "KF96-300" | 4200 ppm | Good | Slightly Aggregated |
| Toner 7 | "KF96SS-300" | 100 ppm | Good | Good |

As is clear from Table 1, in cases of Comparative Toners 1 and 2 where no silicone oils were contained or cases of Comparative Toners 3 to 5 where the silicones oils included had exceedingly high viscosities, although there were no problems in triboelectric charges, storage stability, and the lowest fixing temperature, they had notably low high-temperature offset generating temperatures and showed scratches in the solid portions. By contrast, the toners of the present invention were all excellent having high high-temperature offset generating temperature and no scratches remaining on the solid portions.

As is clear from Table 2, in the cases of Toners 5 and 7 where each of the concentrations of the oligomer components with 20 mer or less in the silicone oil is 1000 ppm or less, the long-term storage stability was good. However, in the cases of Toners 2 and 6, where each the concentrations of the oligomer components with 20 mer or less in the silicone oil exceeds 1000 ppm, the toners are liable to be slightly aggregated. Therefore, even more superior results in long-term storage stability can be obtained when the concentration of the oligomer components with 20 mer or less in the silicone oil is lowered to a level of 1000 ppm or less.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An encapsulated toner for heat-and-pressure fixing comprising a heat-fusible core material containing at least a thermoplastic resin and a coloring agent and a shell comprising a hydrophilic resin formed thereon so as to cover the surface of the core material, wherein the core material contains a silicone oil having a kinematic viscosity of from 10 to 500 cSt at 25° C., wherein said hydrophilic resin comprises an amorphous polyester as a main component and wherein the encapsulated toner is obtained by in situ polymerization method.

2. The encapsulated toner for heat-and-pressure fixing according to claim 1, wherein the concentration of oligomer components with 20mers or less in the silicone oil is 1000 ppm or less.

3. The encapsulated toner for heat-and-pressure fixing according to claim 1, wherein said amorphous polyester has a glass transition temperature of from 50° C. to 80° C.

4. The encapsulated toner for heat-and-pressure fixing according to claim 3, wherein said amorphous polyester has an acid value of from 3 to 50 KOH mg/g.

5. The encapsulated toner for heat-and-pressure fixing according to any one of claims 1 to 2, wherein the glass transition temperature ascribed to a thermoplastic resin used as a main component of the core material is from 10° C. to 50° C.

6. A method for producing an encapsulated toner by in situ polymerization method comprising the following steps (a)–(c):

(a) dissolving an amorphous polyester in a mixture comprising a core material-constituting monomer, a polymerization initiator, a silicone oil, and a coloring agent, wherein said silicone oil has a kinematic viscosity of from 10 to 500 cSt at 25° C.;

(b) dispersing the mixture obtained in step (a) in an aqueous dispersant, and localizing the amorphous polyester on the surface of droplets of a core-constituting material to give a polymerizable composition; and (c) polymerizing the polymerizable composition obtained in step (b) by in situ polymerization method to form a core material, wherein the core material is covered with a shell comprising a hydrophilic resin which comprises the amorphous polyester as a main component, thereby giving an encapsulated toner.

7. The method according to claim 6, further comprising, subsequent to step (c), the following step (d) for carrying out seed polymerization:

(d) adding at least a vinyl polymerizable monomer and a vinyl polymerization initiator to an aqueous suspension of the encapsulated toner obtained in step (c), wherein the encapsulated toner in step (c) is used as precursor particles for seed polymerization, such that the precursor particles absorb at least the vinyl polymerizable monomer and the vinyl polymerization initiator; and polymerizing at least the vinyl polymerizable monomer in a core portion of the precursor particles, to further form a resin for the core material in the precursor particles.

8. The method according to claim 6, wherein the concentration of oligomer components with 20mers or less in the silicone oil is 1000 ppm or less.

9. The method according to any one of claims 6 or 7, wherein the amount of the silicone oil is from 0.1 to 10.0 parts by weight, based on 100.0 parts by weight of the resin for the core material.

* * * * *